(12) United States Patent
Russ et al.

(10) Patent No.: US 12,293,625 B2
(45) Date of Patent: May 6, 2025

(54) USING NON-OPTICAL SHORT-RANGE 3D-TRACKING GESTURE AND MOTION CONTROLLERS AT AN ELECTRONIC GAMING MACHINE

(71) Applicant: IGT, Las Vegas, NV (US)

(72) Inventors: Michael Russ, Styria (AT); Stephan Adamek, Styria (AT); Elisabeth Kiss, Unterpremstätten (AT); Gerhard Pichler, Graz (AT); Bruno Rittner, Hausmannstaetten (AT); Thomas Trenkler, Thal bei Graz Styria (AT)

(73) Assignee: IGT, Las Vegas, NV (US)

( * ) Notice: Subject to any disclaimer, the term of this patent is extended or adjusted under 35 U.S.C. 154(b) by 343 days.

(21) Appl. No.: 17/880,227

(22) Filed: Aug. 3, 2022

(65) Prior Publication Data

US 2024/0046735 A1    Feb. 8, 2024

(51) Int. Cl.
| | |
|---|---|
| *G07F 17/32* | (2006.01) |
| *G06F 3/041* | (2006.01) |
| *G06F 3/046* | (2006.01) |
| *G06F 3/0488* | (2022.01) |

(52) U.S. Cl.
CPC ........ *G07F 17/3209* (2013.01); *G06F 3/0412* (2013.01); *G06F 3/04164* (2019.05); *G06F 3/046* (2013.01); *G06F 3/0488* (2013.01); *G07F 17/3211* (2013.01)

(58) Field of Classification Search
None
See application file for complete search history.

(56) References Cited

U.S. PATENT DOCUMENTS

| | | | |
|---|---|---|---|
| 8,353,759 B2 | 1/2013 | Thorson | |
| 2008/0132313 A1 | 6/2008 | Rasmussen et al. | |
| 2012/0313882 A1* | 12/2012 | Aubauer | G06F 3/046 345/174 |
| 2014/0206428 A1* | 7/2014 | Thompson | G07F 17/3204 463/20 |
| 2014/0267155 A1* | 9/2014 | Aubauer | G06F 3/0445 345/174 |
| 2015/0187167 A1 | 7/2015 | Faul et al. | |

\* cited by examiner

*Primary Examiner* — Lawrence S Galka
(74) *Attorney, Agent, or Firm* — Sage Patent Group

(57) ABSTRACT

Devices, systems and methods are provided. A gaming device includes a non-optical gesture input device to detect gesture inputs performed by a user, a processor circuit and a memory coupled to the processor circuit. The memory includes machine-readable instructions that, when executed by the processor circuit, cause the processor circuit to receive a first gesture input value from the non-optical gesture input device and that corresponds to a user-specific gesture that the user performs, associate the first gesture input value with a first gaming device operation to be performed by the gaming device, and responsive to receiving the first gesture input value that is associated with the first gaming device operation, cause the gaming device to perform the first gaming device operation.

18 Claims, 14 Drawing Sheets

USING NON-OPTICAL SHORT-RANGE 3D-TRACKING GESTURE AND MOTION CONTROLLERS AT AN ELECTRONIC GAMING MACHINE

BACKGROUND

Embodiments described herein relate to providing input for gaming devices, and in particular, to providing gesture inputs at gaming devices, and related devices, systems, and methods.

Nowadays gesture input is well known in multiple technological branches, also including the gaming industry. In the gaming industry, existing gaming methods with gesture control include one- or multi-handed gesture interactions with virtual objects presented on 2D or 3D displays. Moreover, multiple gestures with different hand and/or finger movements may be known.

However, all those known methods focus on optical, camera-based gesture sensors. There are several limitations corresponding to these types of sensors including requiring direct view between the sensor's camera and the user, among others. Also, to date, interaction with such sensors is still quite inaccurate as they are optics-based. Such inaccuracies may repeatedly result in failed position tracking, gesture tracking and/or a loss of position data during gesture interactions. These and other issues may limit such applications to implementations of simplified interactions, such as using gestures only for mostly fun applications or to perform actions that may be skipped (e.g., by pressing a button) without having any impact on the game or its outcome within electronic wagering games. The inexact feeling of current gesture systems might be unappealing to players playing a wagered game if they don't have a feeling of "real" control.

Attracting players to electronic gaming machines (EGMs) in a casino environment may provide increased play of such EGMs. While game theme, content and appearance may help to attract such players, further approaches to attract players may be limited. For example, providing additional interactive functionality at the gaming device may attract players. Many conventional gaming devices employ relatively simple input devices, which may be pedantic and uninteresting. Improving the interaction between the player and the EGM may be advantageous. Further, touchless and/or reduced touch interactions between a player and the EGM may be appealing, particularly during safe distancing protocols that may be caused by external events, such as pandemics, among others.

BRIEF SUMMARY

According to some embodiments, a gaming device is provided. The gaming device includes a non-optical gesture input device to detect gesture inputs performed by a user, a processor circuit, and a memory coupled to the processor circuit, the memory comprising machine-readable instructions that, when executed by the processor circuit, cause the processor circuit to receive a first gesture input value from the non-optical gesture input device and that corresponds to a user-specific gesture that the user performs, associate the first gesture input value with a first gaming device operation to be performed by the gaming device, and responsive to receiving the first gesture input value that is associated with the first gaming device operation, cause the gaming device to perform the first gaming device operation.

According to some embodiments, a method of providing gesture recognition in a gaming device is provided. The method includes providing multiple non-optical gesture input devices, receiving a first gesture input value from a first non-optical gesture input device of the non-optical gesture input devices and second gesture input value from a second non-optical gesture input device of the non-optical gesture input devices, associating the first gesture input value and the second gesture input value to generate a combined gesture input value that corresponds to a user-specific gesture that a user performs, associating the combined gesture input value with a gaming device operation to be performed by the gaming device, and responsive to receiving the combined gesture input value that is associated with the gaming device operation, causing the gaming device to perform the gaming device operation.

According to some embodiments, a system is provided. The system includes a non-optical gesture input device to detect a first gesture by a user of a gaming device and to generate a first gesture input value based on the first gesture, a display device, a processor circuit, and a memory coupled to the processor circuit, the memory including machine-readable instructions that, when executed by the processor circuit, cause the processor circuit to receive the first gesture input value from the non-optical gesture input device, the first gesture input value corresponding to a user-specific gesture that the user performs and that is associated with a first gaming operation of the gaming device, and responsive to receiving the first gesture input value, cause the gaming device to perform the first gaming operation and to cause a display content corresponding to the first gaming operation.

DETAILED DESCRIPTION

Figure 1:
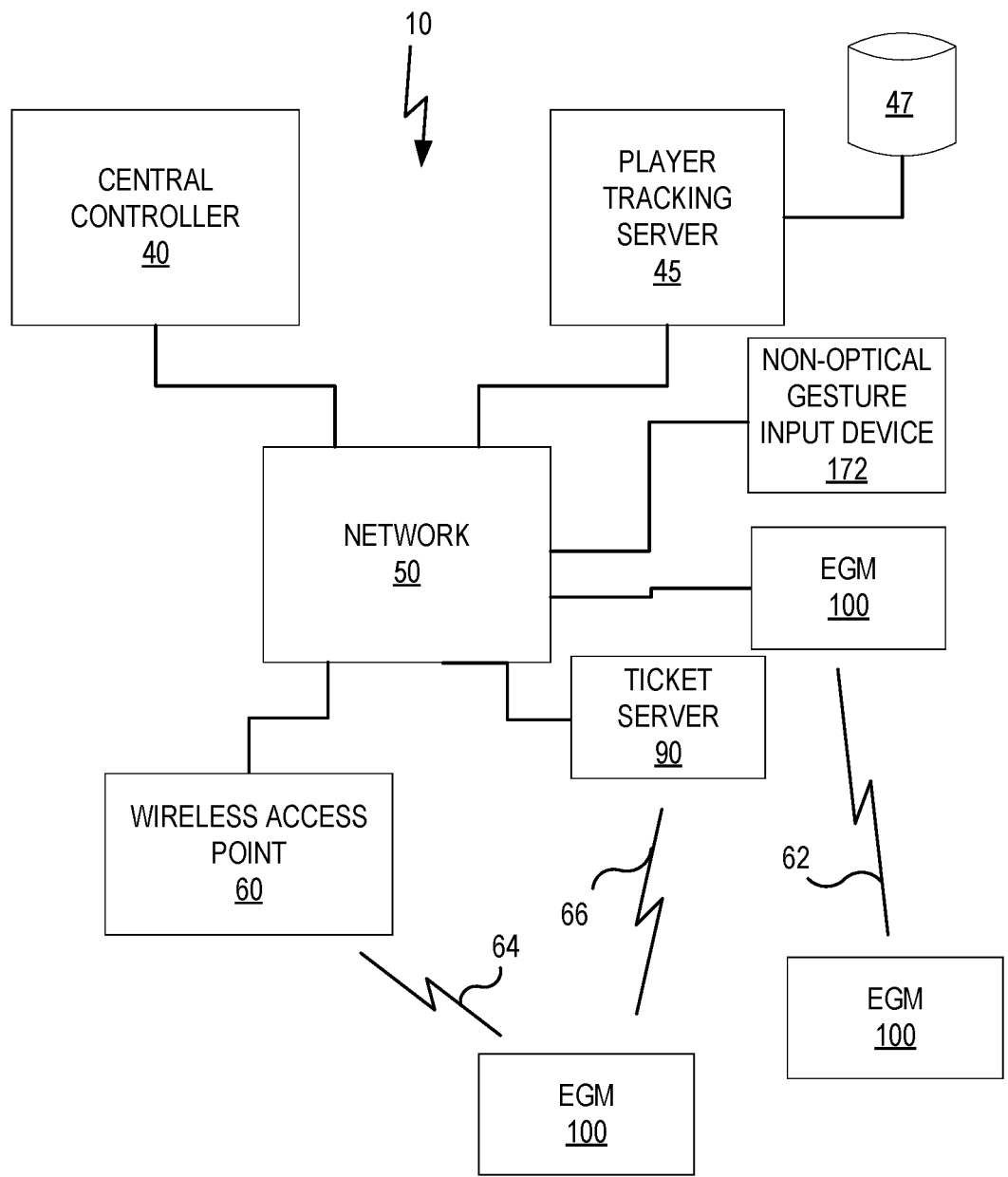
FIG. 1 is a schematic block diagram illustrating a network configuration for a plurality of gaming devices that include non-optical gesture input devices according to some embodiments.

Some embodiments herein provide input rich game-play interaction and immersion by enhancing the human machine interface interactions using accurate non-optical gesture inputs at an EGM.

Inventive concepts herein may make use of Gesture Recognition (GR) as a primary means for a player or technician to interact with an EGM, rather than being used for just a few specialized inputs that complement the normal interaction means such as touchscreens or buttons. By creating personalized libraries of gestures, based on both standardized common gestures and/or gestures personalized to specific user's movements and habits, EGM interaction can be more intuitive and seamless and can be customized to initiate specific sequences of instructions to be executed by the EGM that may not be possible with simple buttons or touches. In some embodiments, this concept may eliminate and/or reduce the need for touchscreens, buttons and/or button panels, which may dramatically change cabinet design of an EGM. For example, the additional space created could be repurposed to reposition and/or reshape speakers and/or screens and/or to move player tracking and other components from the vertical face of the EGM, which may allow even more screen space. Some embodiments herein may provide a more unobstructed view of the screen, much like a television set. In some embodiments, gestures from multiple users may be detected and/or remembered.

Non-optical gesture inputs may be combined with voice recognition, facial recognition, voice commands and/or other biometric inputs to further personalize the experience.

Advantages according to some embodiments may include improved personal hygiene based on a reduction in the need to touch a display that may be touched by other players, etc. Further advantages may include providing a player with more complex interactions with an EGM that are not possible with buttons and/or a touch interface. For example, such complex interactions may include the ability to provide multi-step inputs and/or analog inputs, among others.

In some embodiments, gestures and/or gesture combinations may be learned and remembered by the EGM for each user. A persistent data store of the gestures that are associated with users may be provided in the EGM and/or in a remote data repository. For example, once a player is identified by an EGM, the EGM may request and/or receive the personalized gesture data corresponding to that user. Further, some embodiments provide that gestures may be generated and/or define by the user at the EGM and that such data may be transmitted to the data repository.

In some embodiments, gesture inputs may reduce the need for other inputs and/or input types and thus may eliminate clutter on a front face of EGM to provide an improved player experience.

In some embodiments, gesture recognition may also simplify and/or speed up technician interactions with the EGM. In some embodiments, a gesture could be set to command a single EGM or multiple EGMs, such as a whole bank of proximately located EGM's at once.

Embodiments described herein may provide a focus on enriching game-play interaction and immersion by enhancing the human machine interface interactions with an EGM.

In some embodiments, voice recognition and voice commands may be used in combination with non-optical gesture recognition to further enhance the hands-free interaction.

Newly created gestures may include gestures performed by any part of the body including hands and/or extensions manipulated by the body. Body extensions may include any implement that may be controlled and/or manipulated by the body of a player. This may increase the amount of non-optical gesture recognition that can be created according to embodiments herein.

In some embodiments, gestures may also be used to generate analog inputs rather than simple binary commands such as bet, spin, etc. For example, non-optical gesture recognition may provide the ability to generate an analog command such as a slowly increased a bet, a gradual increase and/or decrease in spin speed during a spin or session, and/or to shape the math pay table curve (within regulatory constraints) by manually manipulating a visual graphic of the pay table curve.

One significant impact of this may be to eliminate or reduce the need for the button panel and/or touch screen, which may provide a cost savings and, in some cases, improve the quality of the screen image.

Within the scope of the current disclosure, however, non-optical sensors with a shorter area of application (short-range), may be used. Thus, electromagnetic field-based non-optical sensors may be used instead of camera-based sensors. Since they do not require direct view to the user and are more accurate, they can be implemented into electronic wagering games to allow novel types of interaction and may also be implemented into user interfaces (such as buttons) without having the user being able to see them. In some embodiments, these sensors may be touch-capable and thus allow a seamless transition from a user's mid-air sensor distance to a touch signal.

As disclosed herein, further functionalities may be provided by these types of sensors, such as accurate 3D (x, y, z-axis) object tracking, recognition of multiple different 3D hand gestures, and proximity, velocity and/or touch sensing capabilities, among others.

Some embodiments provide that a 3D tracker for non-optical gesture sensing may generate a field of multiple electromagnetic lines in mid-air (via transmitters) and may have multiple receivers integrated, which receive the emitted and back incoming signals.

Electrically conducting objects, such as a user's finger placed in the electromagnetic field, change the course of the incoming signals (e.g., the direction and/or strength of the signals.) Based on these changes, a processor is used to interpret the changes of multiple receivers, to compare the changes relative to previously received lines, and, based on the compared changes, is able to interpret the position of the object in 3D space (x, y, z-axis), relatively to the receivers' position. Some embodiments provide that multiple receivers may be used to increase accuracy of the sensor.

By continuously emitting and receiving changes in the electromagnetic field, precise signals can be interpreted and provided to an EGM's controller as "3D coordinates" of the detected object. Via the EGM controller, a mapping of the 3D coordinates relative to a digital object, provided in a virtual 3D room, may be performed. Changes of, e.g., a user's finger position may move the virtual object's position in the virtual 3D room, accordingly.

In some embodiments, the non-optical sensor may track a user's finger distance relative to the tracker's central position. In some embodiments, when the distance decreases to "zero", it may be interpreted as a "touch signal". Based on such a touch signal another action may be performed. For example, a user can first control a 3D object in a virtual 3D environment by moving their finger and landing the object on the virtual 3D room's ground level by touching the sensor with their finger.

In some embodiments, position tracking of a finger touching the sensor (distance=0) could be used to allow 2D movement input, similar to a laptop's touch pad. Some embodiments include the mapping of a finger's position as input for the 3D tracker onto a virtual object's position in a 3D scene and having the finger move to another position causing the virtual object moving in the scene accordingly.

In some embodiments, a 3D tracker may be implemented underneath a surface such as a plastic or glass surface and its electromagnetic lines will still be capable of tracking a finger's input.

In some embodiments, a 3D tracker may be implemented into an EGM's mechanical button and its electromagnetic lines will still be capable of tracking a finger's input next to the button, thus, providing additional functionality to the button.

In some embodiments, 3D finger position tracking may providing functionality of interpreting the finger's movement as an input for a virtual joystick and may include additional lifting and lowering functionalities.

Referring to FIG. 1, a gaming system 10 including a plurality of gaming devices 100 is illustrated. As discussed above, the gaming devices 100 may be one type of a variety of different types of gaming devices, such as electronic gaming machines (EGMs), mobile devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

The system 10 may also include one or more non-optical gesture input devices 172 that may include one or more gesture sensors. In some embodiments, the non-optical gesture input devices 172 may be arranged in an EGM 100 and/or in the area in which the EGM 100 is located. For example, around the non-optical gesture input device 172 may include electromagnetic sensors that detect an action of a conductive object that is within the electromagnetical field generated by the non-optical gesture input device 172. non-optical gesture input devices 172 may be part of a casino surveillance system and/or may be mounted to other structures including walls, columns, a ceiling and/or any other structure in the casino. Each non-optical gesture input device 172 may provide a gesture input value corresponding to the gesture performed by the player. The non-optical gesture input device 172 may further include ultrasonic sensors, optical and/or other suitable sensors for detecting gestures associated with the gaming device 100. In some embodiments, the non-optical gesture input device 172 may include three-dimensional (3D) gesture input sensors to detect a 3D gesture performed by the player, with each 3D gesture input sensor providing a 3D gesture input value corresponding to the 3D gesture performed by the player.

Gaming Devices

Figure 2A:
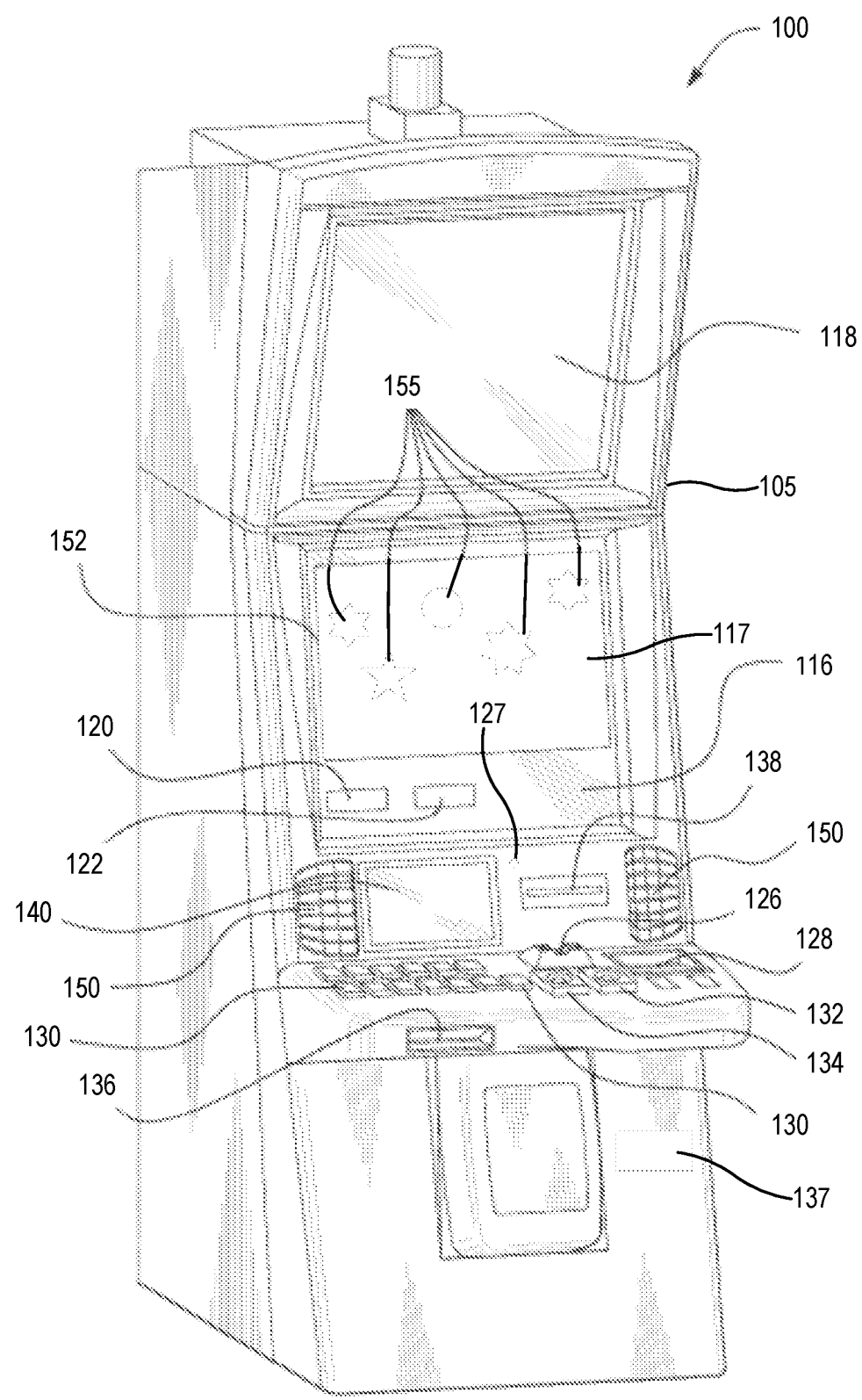
FIG. 2A is a perspective view of a gaming device that includes non-optical gesture input devices and that can be configured according to some embodiments.
Figure 2B:
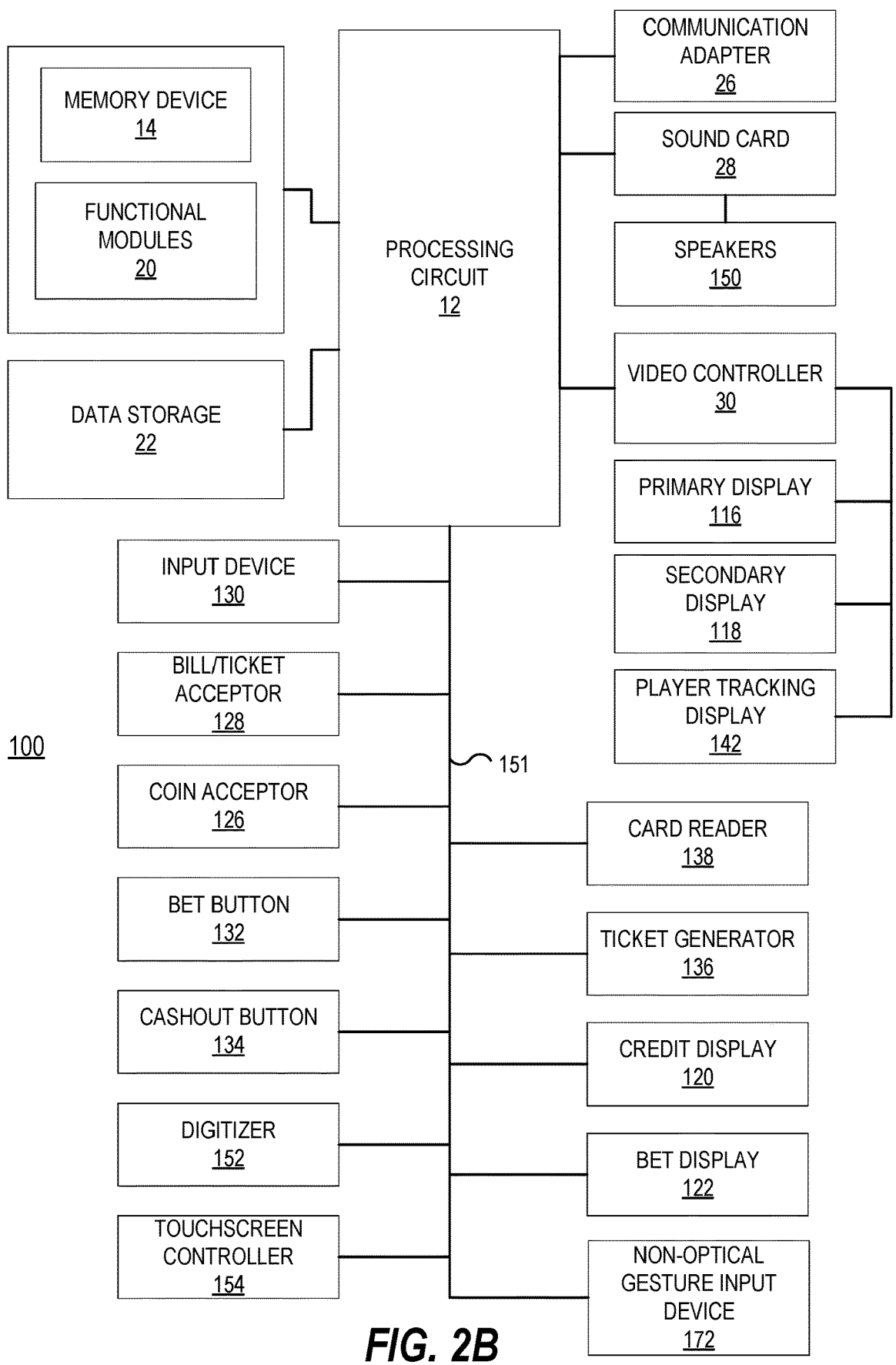
FIG. 2B is a schematic block diagram illustrating an electronic configuration for a gaming device that includes non-optical gesture input devices according to some embodiments.
Figure 2C:
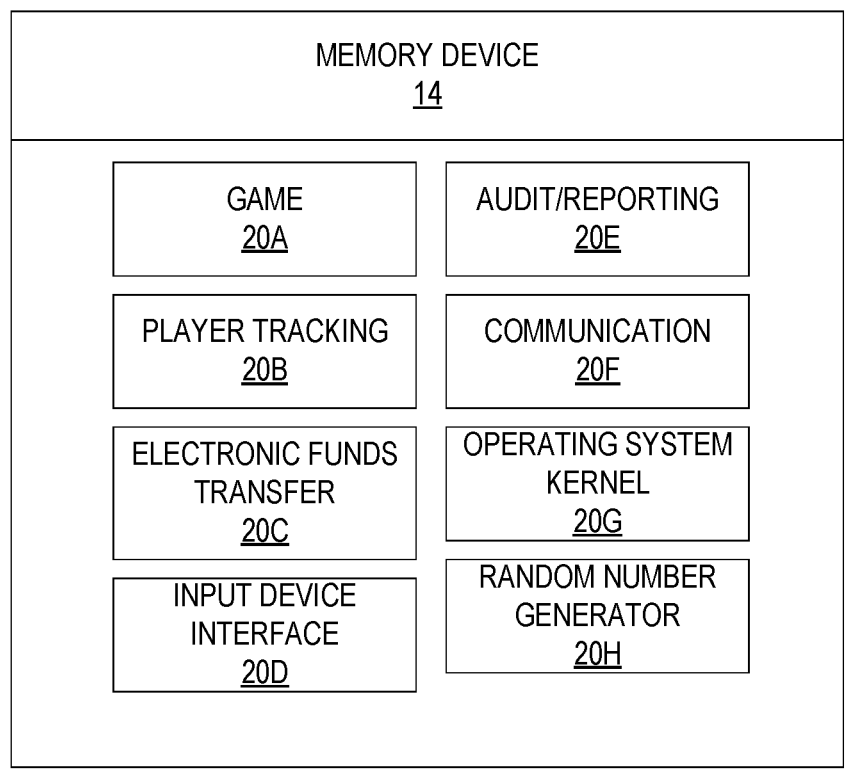
FIG. 2C is a schematic block diagram that illustrates various functional modules of a gaming device that includes non-optical gesture input devices according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture input sensor for a non-optical gesture input device 172, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2C.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 comprises a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
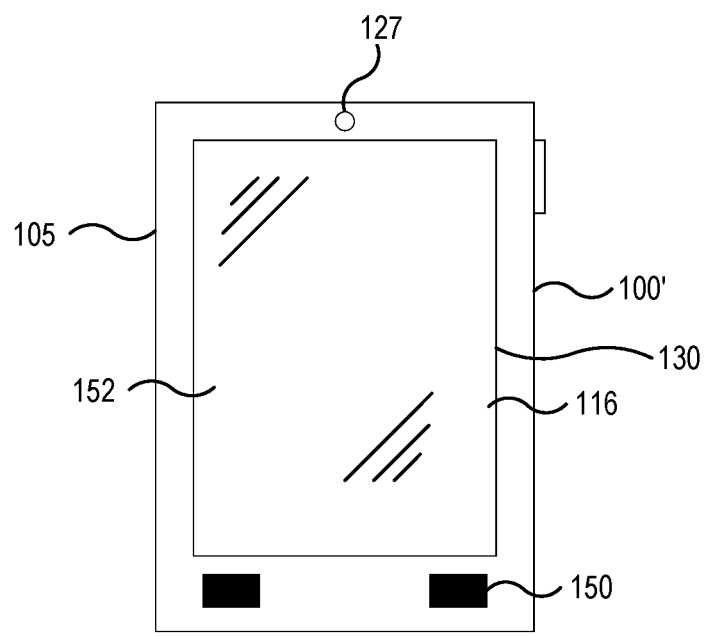
FIG. 2D is perspective view of a gaming device that includes non-optical gesture input devices that can be configured according to some embodiments.

For example, referring to FIG. 2D, a gaming device 100' may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100', various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100' may omit certain features, such as a bill acceptor, a ticket generator, a coin acceptor or dispenser, a card reader, secondary displays, a bet display, a credit display, etc. Credits can be deposited in or transferred from the gaming device 100' electronically.

Figure 2E:
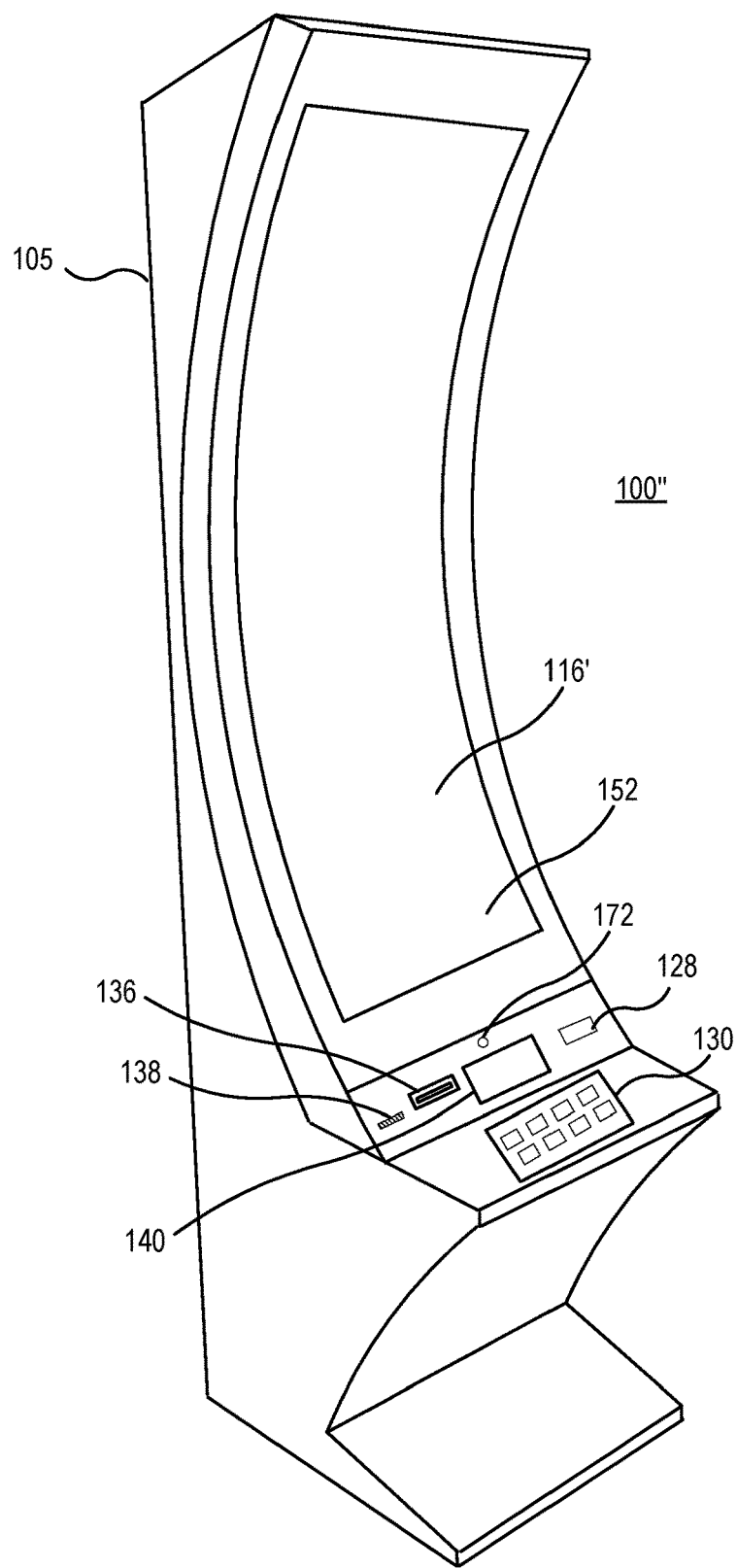
FIG. 2E is a perspective view of a gaming device that includes non-optical gesture input devices according to further embodiments.

FIG. 2E illustrates a standalone gaming device 100" having a different form factor from the gaming device 100 illustrated in FIG. 2A. In particular, the gaming device 100" is characterized by having a large, high aspect ratio, curved primary display device 116' provided in the housing 105, with no secondary display device. The primary display device 116' may include a digitizer 152 to allow touchscreen interaction with the primary display device 116'. The gaming device 100" may further include a player tracking display 142, an input device 130, a bill/ticket acceptor 128, a card reader 138, and a bill/ticket dispenser 136. The gaming device 100" may further include one or more non-optical gesture input devices 172 to enable gesture control of the gaming device 100".

Although illustrated as certain gaming devices, such as electronic gaming machines (EGMs) and mobile devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3:
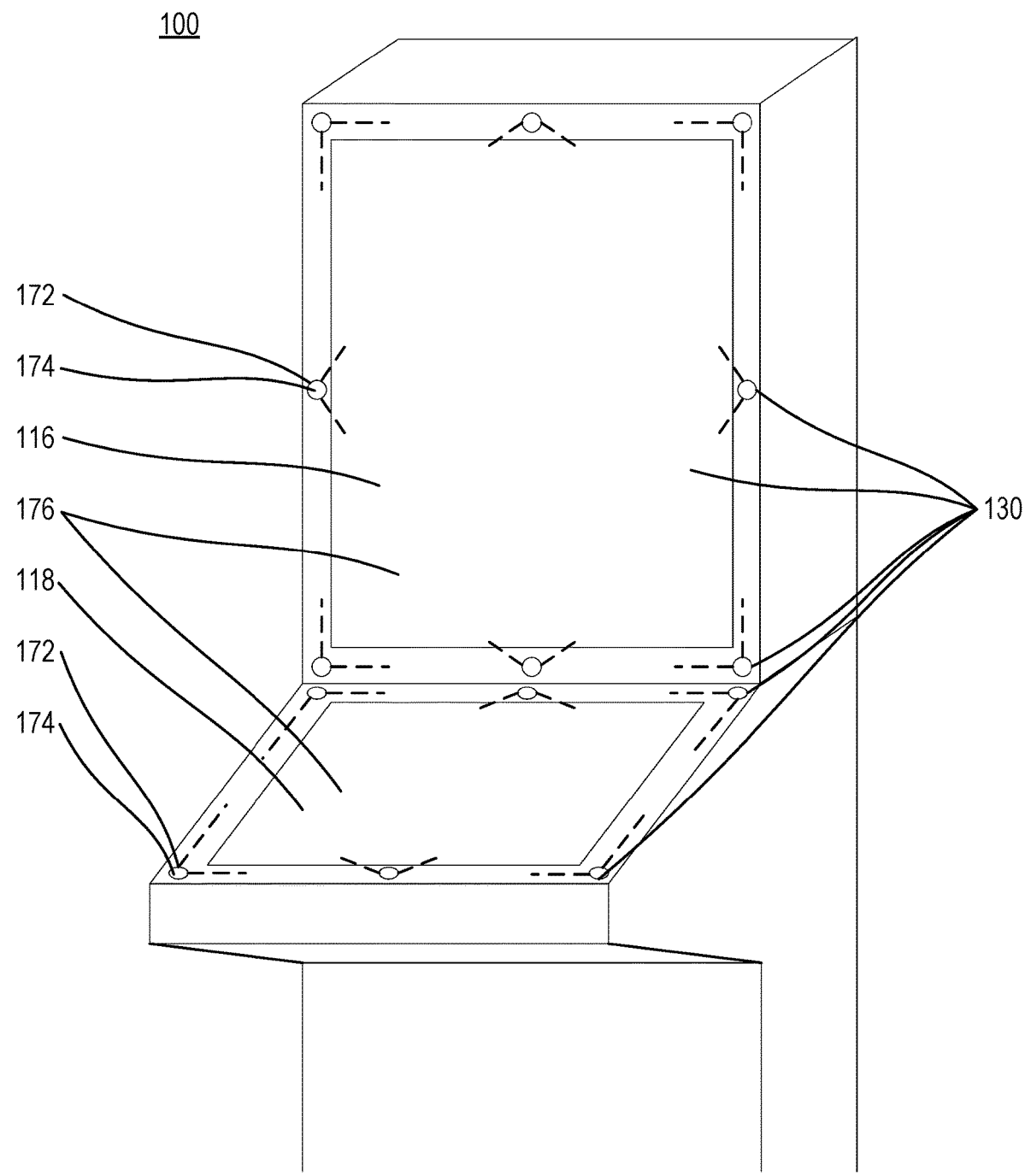
FIG. 3 is a diagram of a gaming device having non-optical gesture input devices to detect player gesture at the gaming device, according to some embodiments.

Referring now to FIG. 3, a gaming device 100 having a plurality of input devices 130 is illustrated according to an embodiment. In this embodiment, the input devices 130 include non-optical gesture input devices 172 including a plurality of non-optical gesture sensors 174 to detect player gestures associated with the gaming device 100. The input devices 130 also include touchscreen input devices 176 for detecting touch input at the display devices 116, 118.

The non-optical gesture sensors 174 may be arranged in multiple locations and may be arranged around the primary display device 116 and the secondary display device 118 in order to detect gestures associated with user interface elements of the display devices 116, 118. For example, each non-optical gesture sensor 174 may provide a gesture input value corresponding to the gesture performed by the player. The non-optical gesture sensors 174 may include ultrasonic sensors and/or other suitable sensors for detecting gestures associated with the gaming device 100. In some embodiments, the non-optical gesture sensors 174 may include three dimensional (3D) non-optical gesture input sensors 174 to detect a 3D gesture performed by the player, with each 3D non-optical gesture input sensor 174 providing a 3D gesture input value corresponding to the 3D gesture performed by the player.

Input Device Features

Figure 4A:
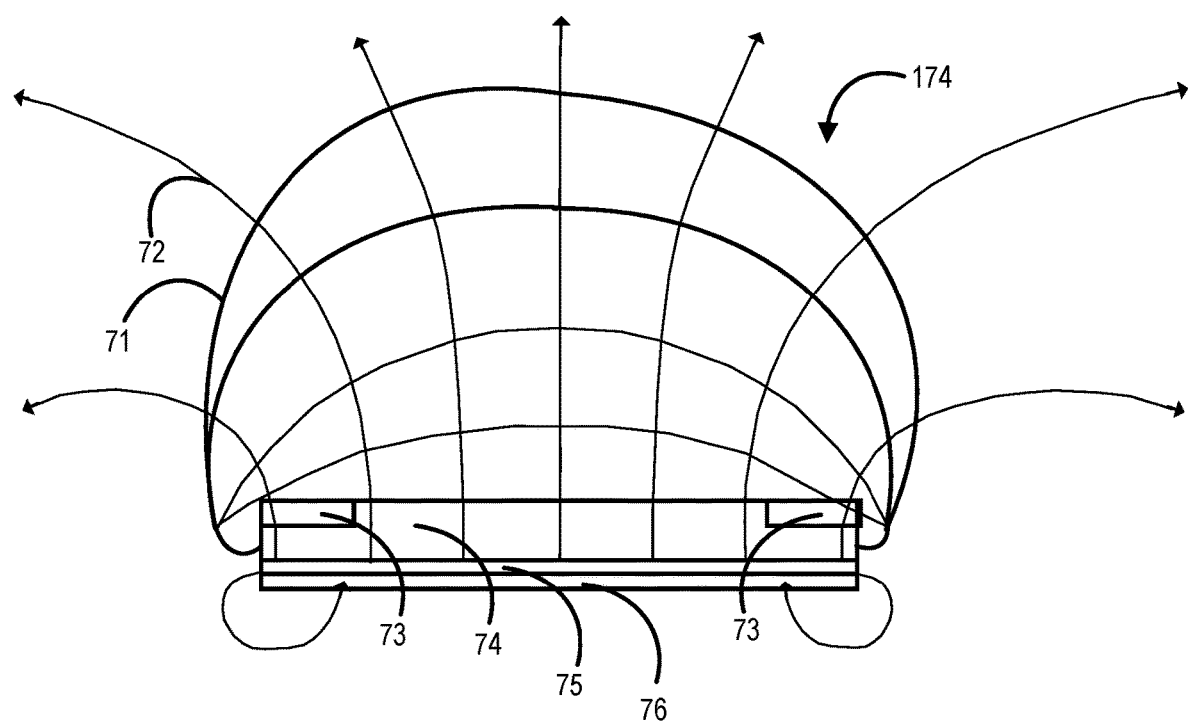
FIGS. 4A and 4B are schematic cross-sectional side views of a non-optical gesture input device respectively without and with a conductive object to be sense according to some embodiments.
Figure 4B:
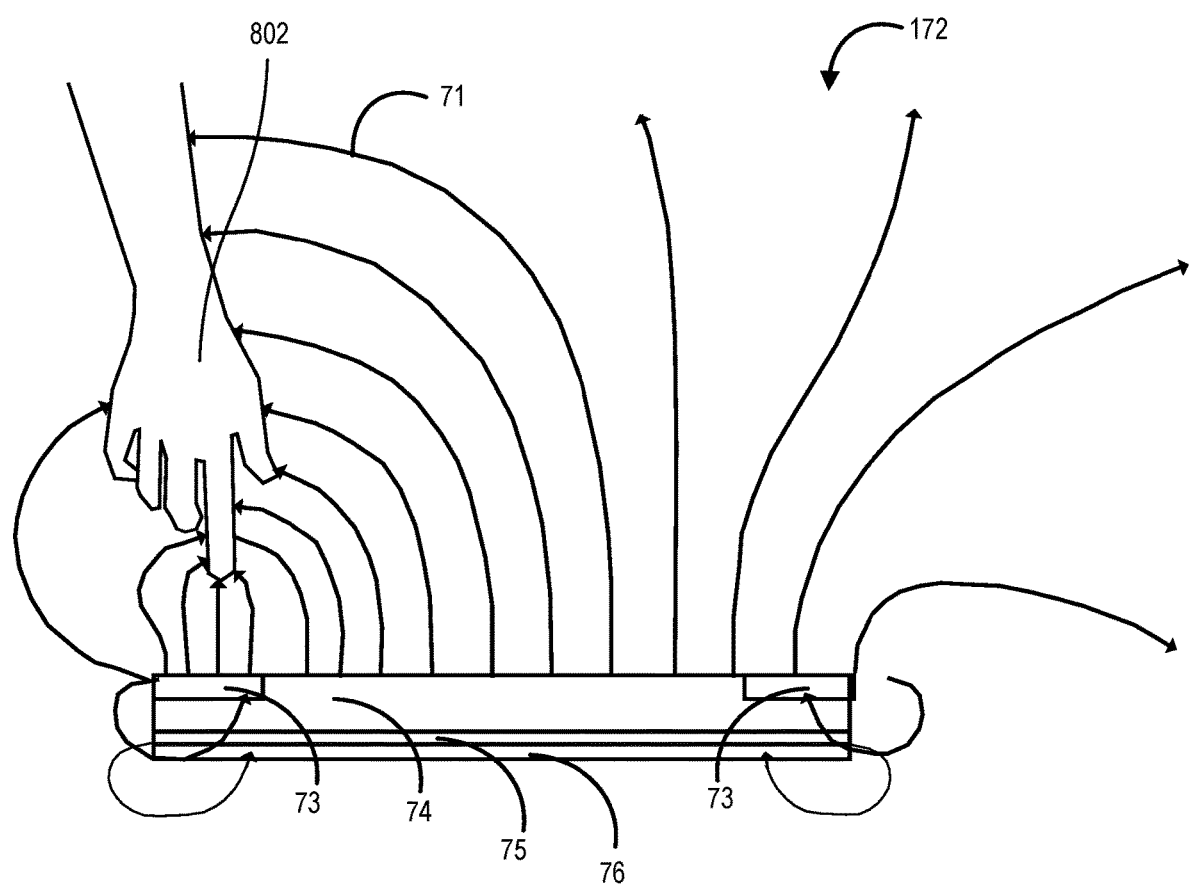

Reference is now made to FIGS. 4A and 4B, which are schematic cross-sectional side views of a non-optical gesture input device respectively without and with a conductive object to be sense according to some embodiments. Referring to FIG. 4A, some embodiments provide that a non-optical gesture sensor 174 includes a ground layer 76 and a transmitter layer 75 that is on the ground layer 76. An insulating layer 74 may be on the transmitter layer 75 such that the transmitter layer 75 is between the ground layer 74 and the insulating layer. In some embodiments, one or more receivers 73 may be embedded into the insulating layer 74.

In some embodiments, a portion of the insulating layer 74 may be arranged between the receivers 73 and the transmitter layer 75. Some embodiments provide that the non-optical gesture sensor 174 works by sensing changes in an otherwise nearly static electromagnetic field measured by an array of electrodes. In some embodiments, accuracy may be up to about 150 dpi as far as six inches above the sensing surface and may capture up to 200 samples per second.

In some embodiments, the non-optical gesture sensor 174 may include 32 KB or more of flash memory and 12 KB or more of RAM to hold its programming, however, such embodiments are non-limiting as the flash memory and/or RAM may include value other than those expressly provided herein. The non-optical gesture sensor 174 may be built into a rigid or flexible surface, and can be located under a device housing. This makes the technology suitable for use in any lighting condition, and ensconced within many form factors (including smartphones).

In some embodiments, the non-optical gesture sensor 174 may have an embedded library of gesture recognition firmware in the controller chip and may use a hidden Markov model (HMM), similar to that used in voice recognition, to identify gestures. This added capability should make the non-optical gesture sensor 174 an option for many applications. The gesture library may initially include common motions like swipe, scroll and zoom, but can be extended. Not needing a camera also eliminates the angle-of-view problems found in camera-based systems. The non-optical gesture sensor 174 provides an even sensing field over the entire sensor area, instead of only within the field of view of a camera. In use and operation, electromagnetic field lines 72 may be generated, which are illustrated along with coordinating equipotential lines 71.

Referring to FIG. 4B, responsive to a gesture input 802 that includes a conductive object moving within the electromagnetic fields 71, the magnitude and/or direction of the electromagnetic fields 71 will change. For example, some embodiments provide that the conductive object comprises one or more portions of a user's body, such as one or more fingers, hands and/or arms, among others. Based on the changes of the electromagnetic fields 71, the non-optical gesture sensor 174 may determine the gesture input data including position, velocity, acceleration and/or coordinates of the gesture input 802. In some embodiments, the gesture input data may be determined and/or updated many times per second which may provide near-real time data. In some embodiments, the conductive object may be multiple conductive objects that may be sensed by the non-optical gesture sensor 174 at the same time. For example, in some embodiments, ten or more different conductive objects may be detected and interpreted at the same time.

Figure 5:
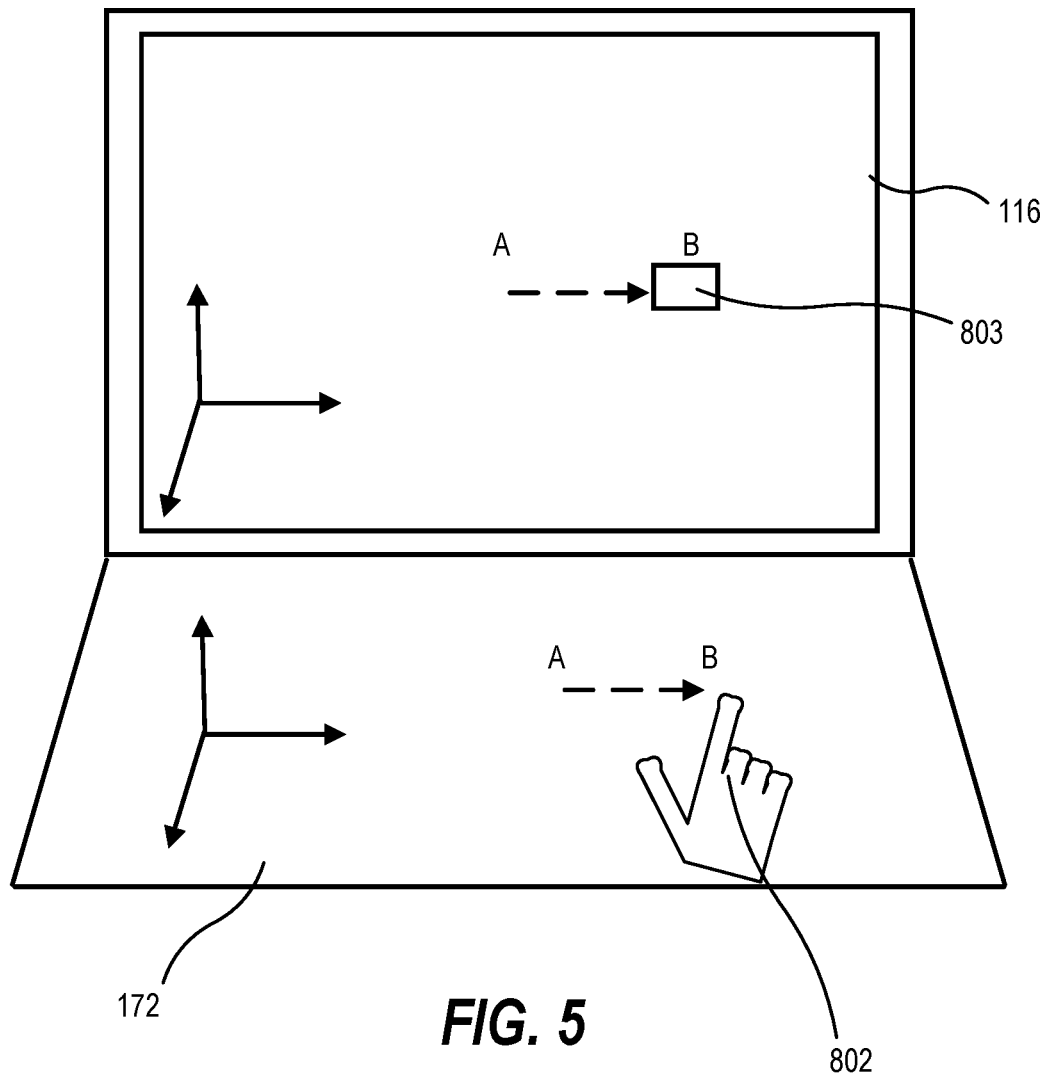
FIG. 5 is a schematic diagram of a use case for integrating a non-optical gesture sensor into or next to a display device according to some embodiments.

Brief reference is now made to FIG. 5, which is a schematic diagram of a use case for integrating a non-optical gesture sensor 174 into or next to a display device 116 according to some embodiments. In some embodiments, integration into or next to display device may enhance interaction possibilities, such as using a finger's position on the Z-axis (track distance to the screen of the display device 116) to enable "depth-interactions" on the screen. For example, multiple layers corresponding to multiple Z-values may be defined on the screen. By moving a finger towards the screen, a player can select between the different Z layers. Some embodiments provide a selection similar to a "cover flow" that may be used in devices for game or music selections. Some embodiments may enable 3D game selections, such as move Left/Right to select game type, move along Z-axis to choose the game within the actual game type. In some embodiments, a digging bonus game to dig "into" the screen may be provided and may include multiple layers. In some embodiments, a player may be instructed not to dig "too deep" in order to not miss any hidden bonus objects.

In some embodiments, the non-optical gesture sensor 174 may differentiate between: a player holding his/her hand in front of screen and a player touching the screen and may show dynamic UI elements based thereon. In some embodiments, the dynamic UI elements may be displayed even before touching the screen.

Some embodiments provide that a player's finger, which is an example of a gesture input 802, is pointing towards interactive touch screen elements. As the finger moves from a position A to a position B, the corresponding UI element 803 may be caused to track the movement from position A to position B in the display screen. In some embodiments, the corresponding UI element 803 may be shown and/or highlighted. Such UI elements 803 may change as the player's finger points at another element. Multiple follow-up actions can be triggered after a short timeout when the finger points at other UI elements for some time.

Figure 6:
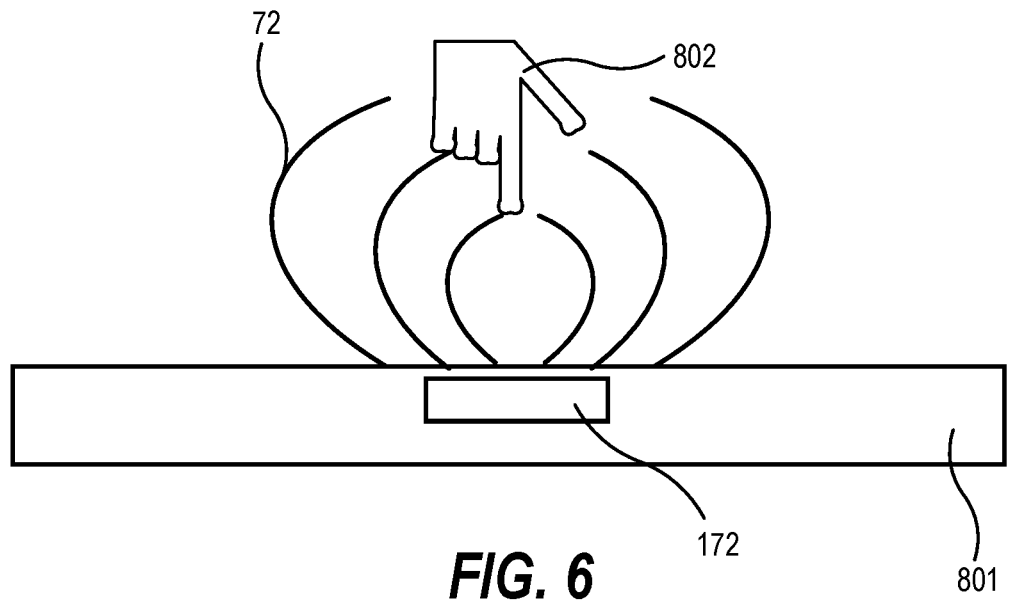
FIG. 6 is a schematic diagram of a use case for integrating a non-optical gesture sensor into a structure according to some embodiments.

Reference is now made to FIG. 6, which is a schematic diagram of a use case for integrating a non-optical gesture sensor into a structure 801 according to some embodiments. For example, some embodiments provide tat the non-optical gesture input device 172 may be implements under a surface of a structure 801. In such embodiments, the structure 801 is a non-conductive material that allows the electromagnetic fields to permeate therethrough. In this manner, the non-optical gesture input device 172 may be undetected by a user while still being fully functional.

Figure 7:
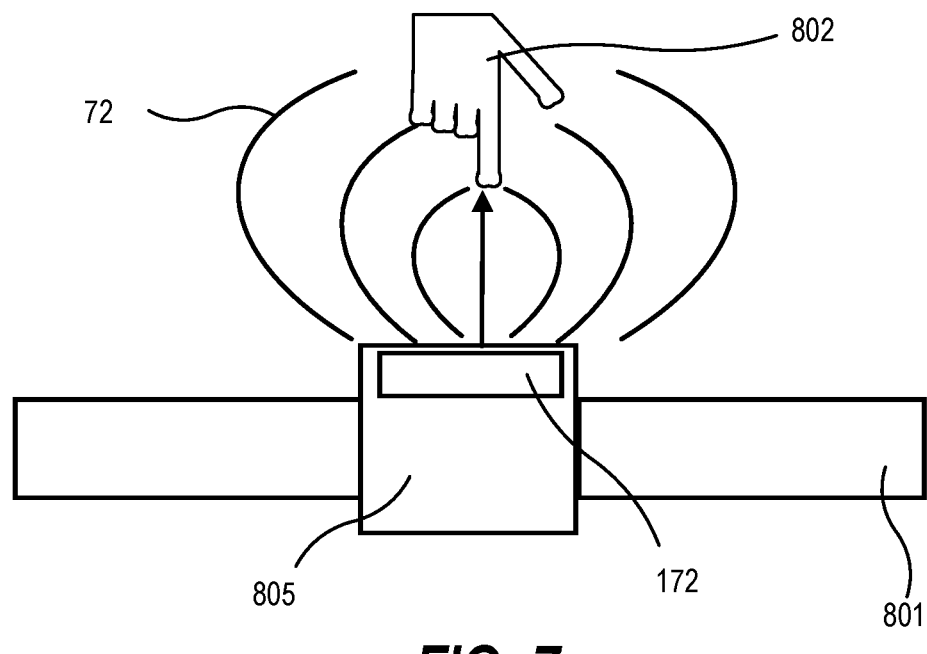
FIG. 7 is a schematic diagram of a use case for integrating a non-optical gesture sensor into a pushbutton structure according to some embodiments.

Reference is now made to FIG. 7, which is a schematic diagram of a use case for integrating a non-optical gesture sensor into a pushbutton structure according to some embodiments. As illustrated, a non-optical gesture device 172 may be integrated with one or more physical pushbuttons 805. In this manner, the gesture data gathered using the non-optical gesture device 172 may be supplemented by information corresponding to actuation of a physical pushbutton. Such additional functionality may allow the differentiation between a player holding hand above the pushbutton 805, a player touching pushbutton 805, and a player pushing the pushbutton 805. For each input, different actions may be provided.

Some embodiments provide that the information corresponding to a player holding a hand above the pushbutton 805 or a player touching the pushbutton 805 is used to predict that player is going to push the pushbutton 805 soon and may trigger game actions based thereon to either encourage the player to push the pushbutton 805 or to encourage them not to push the pushbutton 805.

In some embodiments, the game may be running in auto play mode as long as player is touching the pushbutton 805. Some embodiments provide that, to support responsible gaming goals, the system may require the player to move the hand away from pushbutton 805 sometimes in order to avoid continuous play without interruption.

Some embodiments provide that the game speed may be varied depending on the player holding the hand above the pushbutton 805 and then performing a fast push of the pushbutton 805 to speed the rate of play up. In contrast, the game speed may be slowed down based on holding the hand above the pushbutton 805 and then pushing the pushbutton 805 slowly.

In some embodiments, within a bonus game, the player may be required to first hold their hand in mid-air for some time, then have them touching the pushbutton 805 for some time and ultimately, to press a pushbutton 805 and/or keep the pushbutton 805 pressed for some period of time.

Some embodiments provide that the non-optical gesture input device 172 may be provided as a complete alternative to a physical pushbutton 805, such as a bet button with additional functionality of providing dynamic interaction. In this manner, the EGM may be configured completely with non-physical, gesture-capable buttons only.

In some embodiments, gestures may be used to create analog inputs rather than simple binary commands such as bet, spin, etc. Gesture recognition could create the ability to generate an analog command such as slowly increase bet, gradual increase and/or decrease in spin speed during a spin or session, shape the math pay table curve (within regulatory constraints) by manually manipulating a visual of the pay table curve.

Figure 8:
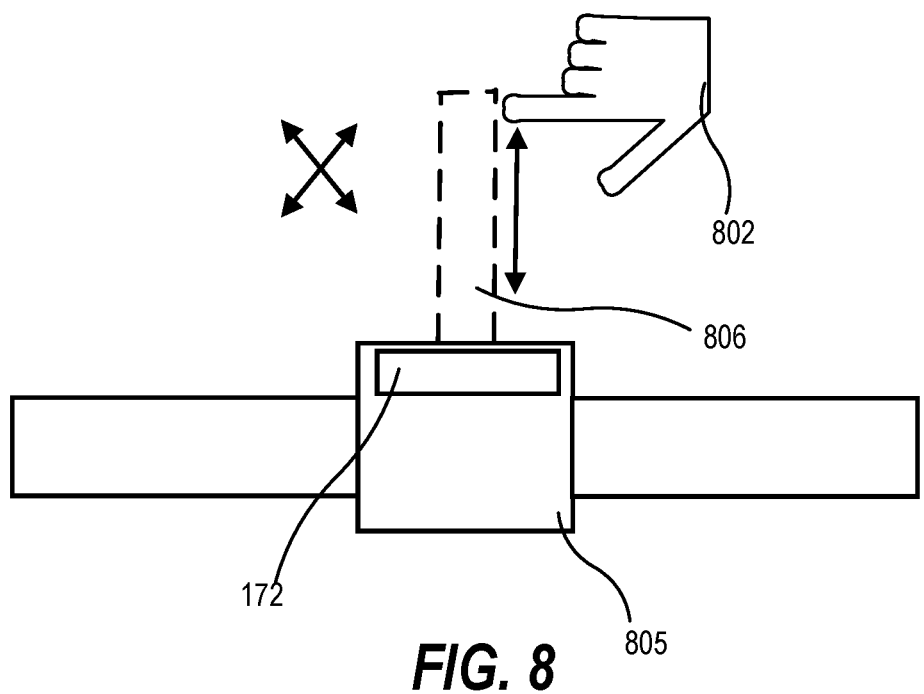
FIG. 8 is a schematic diagram of a use case for integrating a non-optical gesture sensor to provide a virtual joystick according to some embodiments.

Reference is now made to FIG. 8, which is a schematic diagram of a use case for integrating a non-optical gesture sensor to provide a virtual joystick according to some embodiments. As illustrated, a gesture input 802 may include a finger that may be configured to provide a 3D mid-air gesture joystick for enhanced interactions. Such embodiments may enable 3D joystick-like inputs without actually requiring a physical joystick. Instead, the controlling is entirely performed via finger movement only within features and bonuses of an electronic wagering game. For example, finger movement may be used to move a cursor (e.g., with sparkling effects) along the game screen to place the cursor at some spot, resulting in performing a selection on the screen or in receiving hints/tips/explanations based on the cursor position.

In some embodiments, the finger may be used as winder or fishing rod to hook something in order to get a bonus. In some embodiments, the finger may be used to control a 3D object in a game scene and map the 3D movement of the finger with the object movement/alignment in the scene. In some embodiments, the finger may control as a controller within an on-screen navigation menu. For example, the menu pops up when finger is reached out and the player moves the finger so select within the navigation menu. Such mechanisms may resemble circle-like menus from video games, enabling fast and easy selections and/or short cuts. The finger may be used to open a dynamic tool tip menu, enabling such selections via the finger. The content of the menu may be based on where the cursor is pointing.

Some embodiments provide that the non-optical gesture input device 174 may be integrated into other non-interactive components to make them interactive and gesture-controllable. For example, the non-optical gesture input device 172 may be integrated into a speaker to adjust volume. Some embodiments provide that a clockwise or counterclockwise (or up/down) gesture may be performed in front of the speaker to increase or decrease volume. In some embodiments, the speaker/sensor may be touched to mute or un-mute the sound from the speakers. In some embodiments, a user may be able to control speakers' volume individually (e.g., left/right louder for music and center for a quieter voice. In some embodiments, the non-optical gesture input device 172 may be integrated into the feet area to enable foot-actuated game play without having a physical button there. Some embodiments provide that the non-optical gesture input device 172 may be integrated into a Wheel of Fortune type game and perform spin/stop gestures.

In some embodiments, interactions of mid-air gestures may be combined with a pushbutton touch or press to provide a seamless transition from mid-air to touch. In some embodiments, mid-air gestures and/or selections such as browsing through a game chooser, and/or confirming with button touch/press. A hygiene factor may provide that a player does not need to touch the button, but can spin reels if the player is performing a mid-air touch gesture. An approach bonus game may provide that the player must move their finger from mid-air to the button in the correct speed & time, such as simulating how to safely land a helicopter.

In some embodiments, a non-optical gesture input device 172 may measure velocity of the user's hand prior to touching/pressing a button via button-integrated sensors. Based on a fast vs. slow movement of the hand towards a Bet button, the reels may be caused to spin with a fast or slow game play speed. In some embodiments, based on a fast vs. slow movement of the hand towards any button, the button may toggle between min and max value of the button (fast)

or increment selection (slow). In some embodiments, the velocity may be used within a bonus feature, such as pinball, to launch the ball, based on the user's velocity of pressing button.

In some embodiments, linear or exponential acceleration algorithms may be used to enable convenient interactions over larger or multiple screens by just moving the finger within the sensor's short range of operation. In some embodiments, first-time enabled top screen and/or video topper may be selected without requiring the implementation of touch-screen capabilities on those screens. For example, a finger-controlled cursor may move beyond multiple screens and make selections/controls therewith.

In some embodiments, integration of multiple such sensors for additional interaction opportunities may be provided. For example, a pinball game may be provided in which the left and right flippers may be controlled dynamically using update angles based on distance of finger to flipper. In some embodiments, the sensor information of multiple sensors may be combined to, via algorithms, generate one resulting sensor information value or set. In some embodiments, left- and right-hand sided sensors may allow simultaneous dual-hand interactions, such as controlling two 3D objects at a time, one with each hand. Some embodiments provide that separate hands may adjust certain parameters on one single 3D controlled objects (e.g., left hand for acceleration/de-acceleration and right hand for 3D movement in a virtual 3D scene).

Some embodiments provide that a non-optical gesture input device 172 may be integrated into a chair to enhance interaction possibilities while seated. Such interactions may include in an arm rest gestures/finger movement may have all of the above-mentioned features and use-cases available from a chair's arm rest, while seated. A seating surface may use a touch signal to identify if player in front of EGM is sitting or not.

Some embodiments provide that multiple integrated sensors may be combined to identify how the player is sitting in front of EGM and to adapt the UI dynamically based on sitting position.

Other Gaming Device Features

Embodiments described herein may be implemented in various configurations for gaming devices 100s, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Figure 9:
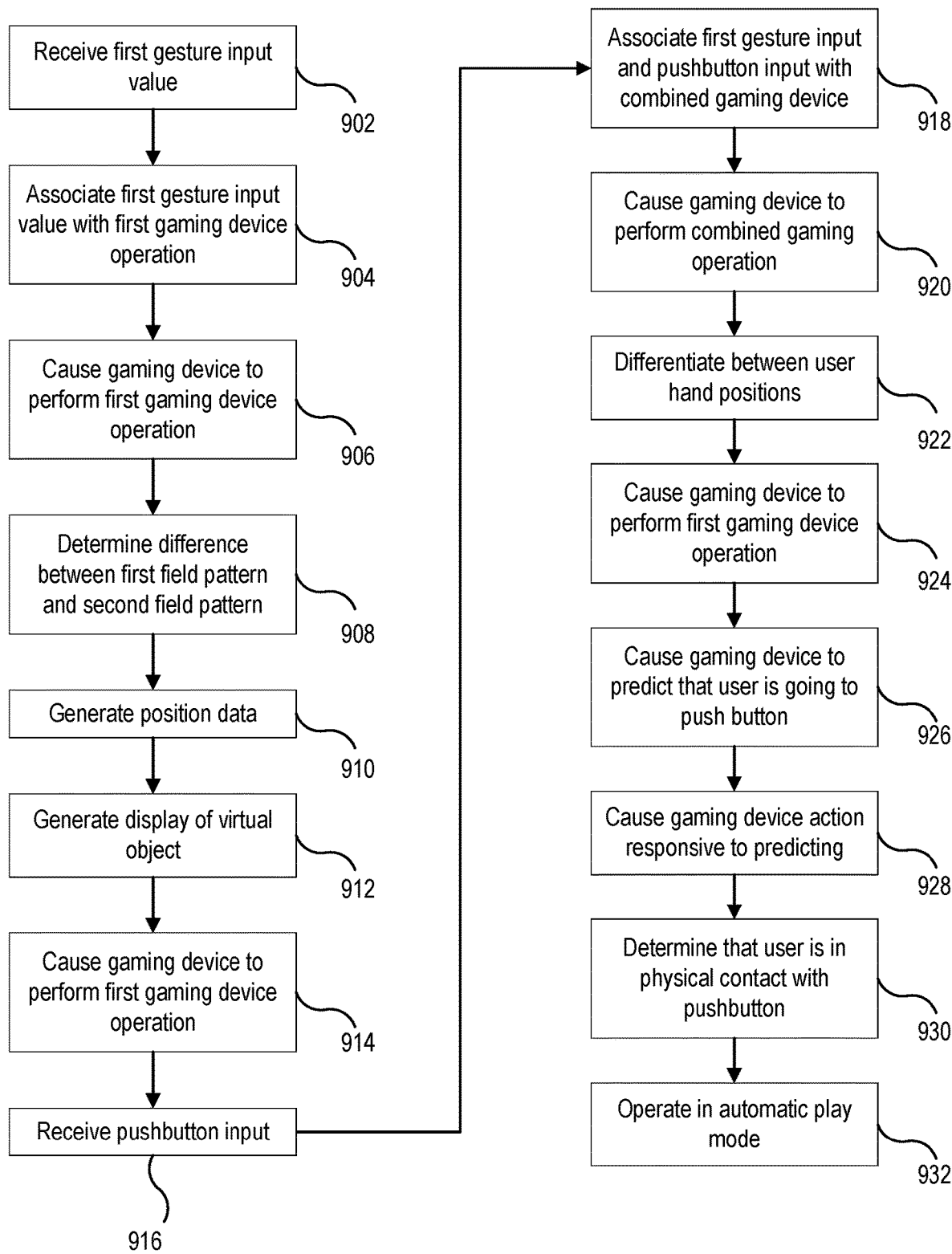
FIG. 9 is a flowchart illustrating operations of systems/methods/devices that include non-optical gesture inputs according to some embodiments.

Reference is now made to FIG. 9, which is a flowchart illustrating operations of systems/methods/devices that include non-optical gesture inputs according to some embodiments. Gaming devices according to some embodiments include a non-optical gesture input device to detect gesture inputs performed by a user, a processor circuit, and a memory coupled to the processor circuit. The memory includes machine-readable instructions that, when executed by the processor circuit, cause the processor circuit to receive (block 902) a first gesture input value from the non-optical gesture input device and that corresponds to a user-specific gesture that the user performs and associate (block 904) the first gesture input value with a first gaming device operation to be performed by the gaming device. The processor circuit may be further caused to, responsive to receiving the first gesture input value that is associated with the first gaming device operation, cause the gaming device to perform (block 906) the first gaming device operation.

In some embodiments, the non-optical gesture input device includes an electromagnetic transmitter layer and an electromagnetic receiver layer that are configured to generate an electromagnetic field. In some embodiments, the non-optical gesture input device is configured to generate a first set of electromagnetic field lines that includes a first field pattern that corresponds to the electromagnetic field lines uninterrupted by a conductive object and to generate a second set of electromagnetic field lines that is different from the first set of electromagnetic field lines and that includes a second field pattern that corresponds to the electromagnetic field being interrupted by the conductive object.

In some embodiments, the electromagnetic receiver layer includes a lateral electromagnetic receiver layer and a center electromagnetic receiver layer. Some embodiments provide that the non-optical gesture input device further includes a ground layer attached to a first side of the electromagnetic transmitter layer and an isolation layer attached to a second side of the electromagnetic transmitter layer that is opposite the first side of the electromagnetic transmitter layer. In some embodiments, the isolation layer is between the electromagnetic receiver layer and the electromagnetic transmitter layer.

Some embodiments provide that the instructions further cause the processor circuit to determine (block 908) a difference between the first field pattern and the second field pattern and to generate (block 910) position data corresponding to the conductive object in three-dimensional space relative to the non-optical gesture input device. In some embodiments, the position data includes an x-axis value corresponding to an x-axis, a y-axis value corresponding to a y-axis and a z-axis value corresponding to a z-axis.

In some embodiments, the gaming device further includes a display device that is operable to display game content provided by the gaming device. In response to movement of the conductive object in the electromagnetic field, the z-axis value corresponds to a depth interaction that is displayed on the display device.

In some embodiments, two-dimensional movement of the conductive object corresponds to non-zero x-axis and y-axis values and a zero z-axis value. Some embodiments provide that the z-axis extends away from the non-optical gesture input device and that, responsive to the z-axis value being zero, a touch input is generated as a portion of the first gesture input value.

In some embodiments, the instructions further cause the processor circuit to generate (block 912) a display of a virtual object that corresponds to a location of the conductive object.

In some embodiments, the non-optical gesture input device is visually hidden from a user by being arranged below a surface of the gaming device. In some embodiments, the surface of the gaming device is a non-conductive material and the non-conductive material is transmissive of electromagnetic field lines that are generated by the non-optical gesture input device.

Some embodiments provide that the non-optical gesture input device is visually hidden from a user by being arranged within a physical pushbutton of the gaming device. Some embodiments provide that the physical pushbutton of the gaming device is a non-conductive material and that the non-conductive material is transmissive of electromagnetic field lines that are generated by the non-optical gesture input device.

In some embodiments, the instructions further cause the processor circuit to receive (block 916) a pushbutton input generated by actuation of the physical pushbutton and to associate (block 918) the first gesture input value combined with the pushbutton input with a combined gaming device operation to be performed by the gaming device. In response to receiving the first gesture input value combined with the pushbutton input, the gaming device is caused (block 920) to perform the combined gaming device operation.

Some embodiments provide that the instructions further cause the processor circuit to differentiate (block 922) between a user hand being held above the physical pushbutton, a user touching the physical pushbutton, and the user pushing the physical pushbutton to determine the first gesture input value and, responsive to the differentiating, to cause the gaming device to perform (block 924) the first gaming device operation that corresponds to the first gesture input value.

In some embodiments, wherein the instructions further cause the processor circuit to cause (block 926) the gaming device to predict that the user is going to push the physical pushbutton and to cause (block 928) a gaming action in response to predicting that the user is going to push the physical pushbutton. In some embodiments, the instructions further cause the processor circuit to cause the gaming device to determine (block 930) that the user is contacting the physical pushbutton and to cause the gaming device to operate (block 932) in an automatic play mode in which the gaming device plays until the user is not in contact with the physical pushbutton.

In some embodiments, the conductive object includes a finger of the user and, responsive to movement of the finger in the electromagnetic field, an input of a virtual joystick is generated. Some embodiments provide that, responsive to the input corresponding to the virtual joystick, the first gaming device operation includes controlling a virtual object that is displayed by the gaming device.

Some embodiments provide that the conductive object is a finger of the user and, responsive to movement of the finger in electromagnetic field, an input of a virtual joystick is generated. In some embodiments, responsive to the input corresponding to the virtual joystick, the first gaming device operation includes controlling a navigation menu that is displayed by the gaming device.

In some embodiments, the first gesture input value from the non-optical gesture input device includes a movement characteristic that corresponds to movement of the conductive object relative to the non-optical gesture input device.

Figure 10:
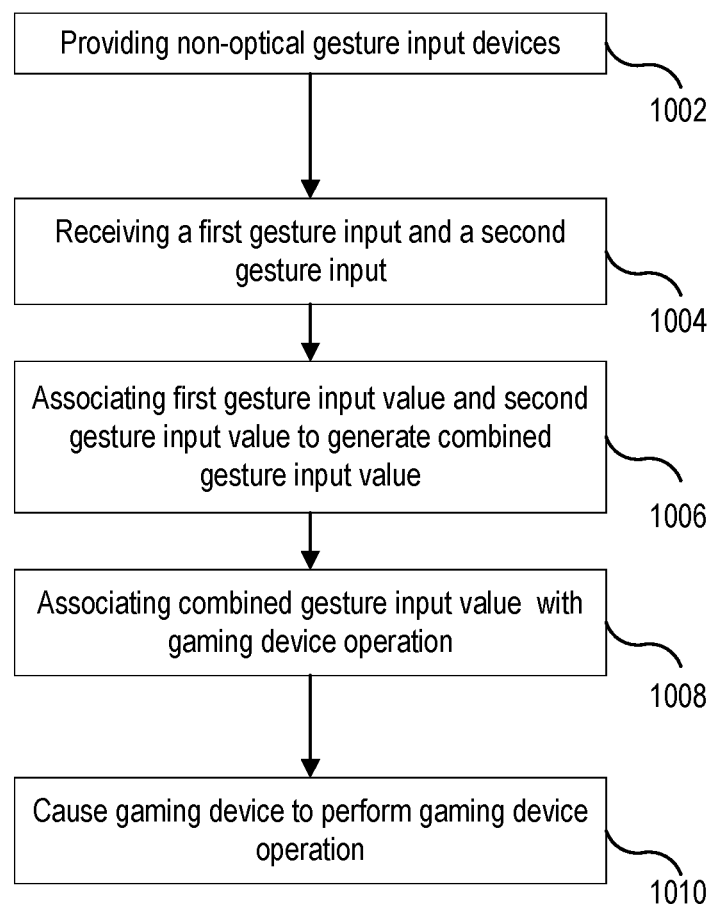
FIG. 10 is a flowchart illustrating operations of systems/methods/devices that include non-optical gesture inputs according to some embodiments.

Reference is now made to FIG. 10, which is a flowchart illustrating operations of systems/methods/devices that include non-optical gesture inputs according to some embodiments. Operations of methods disclosed herein may include methods for providing gesture recognition in a gaming device. Operation of such methods may include providing (block 1002) multiple non-optical gesture input devices and receiving (block 1004) a first gesture input value from a first non-optical gesture input device of the non-optical gesture input devices and second gesture input value from a second non-optical gesture input device of the non-optical gesture input devices. Operations may include associating (block 1006) the first gesture input value and the second gesture input value to generate a combined gesture input value that corresponds to a user-specific gesture that a user performs and associating (block 1008) the combined gesture input value with a gaming device operation to be performed by the gaming device. In response to receiving the combined gesture input value that is associated with the gaming device operation, causing (block 1010) the gaming device to perform the gaming device operation. In some embodiments, one of the of non-optical gesture input devices is integrated into a gaming device cabinet that comprises a user seating surface.

Figure 11:
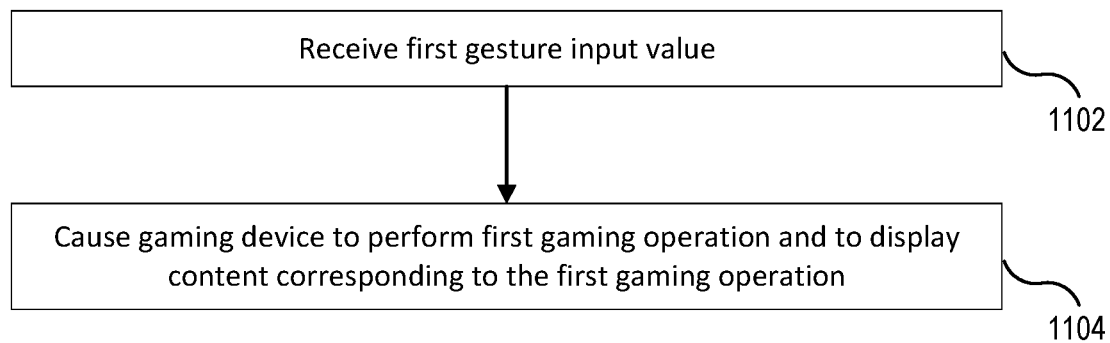
FIG. 11 is a flowchart illustrating operations of systems/methods/devices that include non-optical gesture inputs according to some embodiments.

Reference is now made to FIG. 11, which is a flowchart illustrating operations of systems/methods/devices that include non-optical gesture inputs according to some embodiments. A system of some embodiments includes a non-optical gesture input device to detect a first gesture by a user of a gaming device and to generate a first gesture input value based on the first gesture, a display device, a processor circuit and a memory coupled to the processor circuit. The memory includes machine-readable instructions that, when executed by the processor circuit, cause the processor circuit to receive (block 1102) the first gesture input value from the non-optical gesture input device, the first gesture input value corresponding to a user-specific gesture that the user performs and that is associated with a first gaming operation of the gaming device. In response to receiving the first gesture input value, causing (block 1106) the gaming device to perform the first gaming operation and to cause a display content corresponding to the first gaming operation.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A gaming device comprising:
a non-optical gesture input device to detect gesture inputs performed by a user;
a processor circuit; and
a memory coupled to the processor circuit, the memory comprising machine-readable instructions that, when executed by the processor circuit, cause the processor circuit to:
receive a first gesture input value from the non-optical gesture input device and that corresponds to a user-specific gesture that the user performs;
associate the first gesture input value with a first gaming device operation to be performed by the gaming device; and
responsive to receiving the first gesture input value that is associated with the first gaming device operation, cause the gaming device to perform the first gaming device operation,
wherein the non-optical gesture input device is visually hidden from a user by being arranged within a physical pushbutton of the gaming device,
wherein the physical pushbutton of the gaming device comprises a non-conductive material, and
wherein the non-conductive material is transmissive of electromagnetic field lines that are generated by the non-optical gesture input device,
wherein the instructions further cause the processor circuit to:
receive a pushbutton input generated by actuation of the physical pushbutton; and associate the first gesture input value combined with the pushbutton input with a combined gaming device operation to be performed by the gaming device; and responsive to receiving the first gesture input value combined with the pushbutton input, cause the gaming device to perform the combined gaming device operation.

2. The gaming device of claim 1, wherein the non-optical gesture input device comprises an electromagnetic transmitter layer and an electromagnetic receiver layer that are configured to generate an electromagnetic field, wherein the non-optical gesture input device is configured to generate a first set of electromagnetic field lines that comprises a first field pattern that corresponds to the electromagnetic field lines uninterrupted by a conductive object and to generate a second set of electromagnetic field lines that is different from the first set of electromagnetic field lines and that comprises a second field pattern that corresponds to the electromagnetic field being interrupted by the conductive object.

3. The gaming device of claim 1, wherein the electromagnetic receiver layer comprise a lateral electromagnetic receiver layer and a center electromagnetic receiver layer, wherein the non-optical gesture input device further comprises a ground layer attached to a first side of the electromagnetic transmitter layer and an isolation layer attached to a second side of the electromagnetic transmitter layer that is opposite the first side of the electromagnetic transmitter layer, and wherein the isolation layer is between the electromagnetic receiver layer and the electromagnetic transmitter layer.

4. The gaming device of claim 2, wherein the instructions further cause the processor circuit to:

determine a difference between the first field pattern and the second field pattern; and generate position data corresponding to the conductive object in three-dimensional space relative to the non-optical gesture input device, wherein the position data comprises an x-axis value corresponding to an x-axis, a y-axis value corresponding to a y-axis and a z-axis value corresponding to a z-axis.

5. The gaming device of claim 4, wherein the gaming device further comprises a display device that is operable to display game content provided by the gaming device, wherein, responsive to movement of the conductive object in the electromagnetic field, the z-axis value corresponds to a depth interaction that is displayed on the display device.

6. The gaming device of claim 5, wherein two-dimensional movement of the conductive object corresponds to non-zero x-axis and y-axis values and a zero z-axis value.

7. The gaming device of claim 4, wherein the z-axis extends away from the non-optical gesture input device and wherein, responsive to the z-axis value being zero, a touch input is generated as a portion of the first gesture input value.

8. The gaming device of claim 1, wherein the instructions further cause the processor circuit to generate a display of a virtual object that corresponds to a location of the conductive object.

9. The gaming device of claim 1, wherein the non-optical gesture input device is visually hidden from a user by being arranged below a surface of the gaming device, wherein the surface of the gaming device comprises a non-conductive material, and wherein the non-conductive material is transmissive of electromagnetic field lines that are generated by the non-optical gesture input device.

10. The gaming device of claim 1, wherein the instructions further cause the processor circuit to:

differentiate between a user hand being held above the physical pushbutton, a user touching the physical pushbutton, and the user pushing the physical pushbutton to determine the first gesture input value; and responsive to the differentiating, cause the gaming device to perform the first gaming device operation that corresponds to the first gesture input value.

11. The gaming device of claim 10, wherein the instructions further cause the processor circuit to:

cause the gaming device to predict that the user is going to push the physical pushbutton; and to cause a gaming action in response to predicting that the user is going to push the physical pushbutton.

12. The gaming device of claim 10, wherein the instructions further cause the processor circuit to:

cause the gaming device to determine that the user is contacting the physical pushbutton; and to cause the gaming device to operate in an automatic play mode in which the gaming device plays until the user is not in contact with the physical pushbutton.

13. The gaming device of claim 2, wherein the conductive object comprises a finger of the user, wherein, responsive to movement of the finger in the electromagnetic field, an input of a virtual joystick is generated, and wherein, responsive to the input corresponding to the virtual joystick, the first gaming device operation comprises controlling a virtual object that is displayed by the gaming device.

14. The gaming device of claim 2, wherein the conductive object comprises a finger of the user, wherein, responsive to movement of the finger in electromagnetic field, an input of a virtual joystick is generated, and wherein, responsive to the input corresponding to the virtual joystick, the first gaming device operation comprises controlling a navigation menu that is displayed by the gaming device.

15. The gaming device of claim 1, the first gesture input value from the non-optical gesture input device comprises a movement characteristic that corresponds to movement of the conductive object relative to the non-optical gesture input device.

16. A method of providing gesture recognition in a gaming device, the method comprising:

providing a plurality of non-optical gesture input devices;

receiving a first gesture input value from a first non-optical gesture input device of the plurality non-optical gesture input devices and second gesture input value from a second non-optical gesture input device of the plurality of non-optical gesture input devices;

associating the first gesture input value and the second gesture input value to generate a combined gesture input value that corresponds to a user-specific gesture that a user performs;

associating the combined gesture input value with a gaming device operation to be performed by the gaming device; and responsive to receiving the combined gesture input value that is associated with the gaming device operation, causing the gaming device to perform the gaming device operation.

17. The method of claim 16, wherein one of the plurality of non-optical gesture input devices is integrated into a gaming device cabinet that comprises a user seating surface.

18. A system comprising:
a non-optical gesture input device to detect a first gesture by a user of a gaming device and to generate a first gesture input value based on the first gesture;
a display device;
processor circuit; and
a memory coupled to the processor circuit, the memory comprising machine-readable instructions that, when executed by the processor circuit, cause the processor circuit to:
receive the first gesture input value from the non-optical gesture input device, the first gesture input value corresponding to a user-specific gesture that the user performs and that is associated with a first gaming operation of the gaming device; and
responsive to receiving the first gesture input value, cause the gaming device to perform the first gaming operation and to cause a display content corresponding to the first gaming operation,
wherein a first field pattern that corresponds to the electromagnetic field lines uninterrupted by a conductive object
wherein the conductive object comprises a finger of the user,
wherein, responsive to movement of the finger in the electromagnetic field, an input of a virtual joystick is generated, and
wherein, responsive to the input corresponding to the virtual joystick, the first gaming device operation comprises controlling a virtual object that is displayed by the gaming device.

* * * * *